US007688340B2

(12) United States Patent
Donaldson et al.

(10) Patent No.: US 7,688,340 B2
(45) Date of Patent: Mar. 30, 2010

(54) SYSTEM AND METHOD FOR CONTROLLING THE LOWER POWER BOUND FOR A RASTER OUTPUT SCANNER IN A COLOR XEROGRAPHIC PRINTER

(75) Inventors: Patricia J. Donaldson, Pittsford, NY (US); Mark A. Scheuer, Williamson, NY (US); Daniel W. MacDonald, Chocowinity, NC (US)

(73) Assignee: Xerox Corporation, Norwalk, CT (US)

( * ) Notice: Subject to any disclaimer, the term of this patent is extended or adjusted under 35 U.S.C. 154(b) by 1631 days.

(21) Appl. No.: 10/916,301

(22) Filed: Aug. 11, 2004

(65) Prior Publication Data

US 2006/0033946 A1 Feb. 16, 2006

(51) Int. Cl.
*B41J 2/47* (2006.01)
*B41J 2/435* (2006.01)
*G03G 15/00* (2006.01)
*G03G 15/02* (2006.01)

(52) U.S. Cl. .................. 347/253; 347/236; 347/246; 399/48; 399/50

(58) Field of Classification Search ............ 347/253, 347/236, 246; 399/48, 50
See application file for complete search history.

(56) References Cited

U.S. PATENT DOCUMENTS

| 5,023,632 | A | 6/1991 | Yamamoto et al. |
| 5,252,995 | A * | 10/1993 | Trask et al. ............... 347/119 |
| 5,296,877 | A | 3/1994 | Sato |
| 5,471,313 | A * | 11/1995 | Thieret et al. ............. 358/296 |
| 5,534,990 | A * | 7/1996 | Harris ..................... 399/223 |
| 5,541,721 | A * | 7/1996 | Scheuer et al. ............. 399/50 |
| 6,111,593 | A | 8/2000 | Henderson et al. |
| 6,560,418 | B2 * | 5/2003 | Campbell et al. ........... 399/49 |
| 2003/0058332 | A1 * | 3/2003 | Fujiwara .................. 347/253 |
| 2004/0115552 | A1 | 6/2004 | Lewis |

* cited by examiner

*Primary Examiner*—Stephen D Meier
*Assistant Examiner*—Sarah Al-Hashimi
(74) *Attorney, Agent, or Firm*—Maginot, Moore & Beck LLP

(57) ABSTRACT

A method and system for a color xerographic machine determines a lower bound for the ROS power levels so that color defects are not produced by light attenuation from one or more layers of toner particles on a latent image. The method computes a minimum ROS power level for the photoreceptor at its maximum and minimum charge levels. The minimum ROS power level is the level at which the discharge voltage does not drop beyond a maximum discharge voltage difference. The difference is related to a toner particle density that affects color reproduction. The minimum ROS power levels for the minimum and maximum photoreceptor charge levels are used to compute a functional relationship for minimum ROS power levels at other photoreceptor charge levels. Thereafter, the minimum ROS power level function may be used to compute minimum ROS power levels for other photoreceptor charge levels. The computed minimum ROS power levels may be used to control the power levels used during color reproduction performed by the machine.

16 Claims, 5 Drawing Sheets

SYSTEM AND METHOD FOR CONTROLLING THE LOWER POWER BOUND FOR A RASTER OUTPUT SCANNER IN A COLOR XEROGRAPHIC PRINTER

FIELD OF THE INVENTION

This invention relates generally to the image quality in a color image output terminal (IOT), and more particularly, it relates to the control of raster output scanner (ROS) power for exposing a latent image through previous toner layers in an image-on-image (IOI) color printing machine.

BACKGROUND OF THE INVENTION

In a typical electrophotographic printing process, a photoconductive member is charged to a substantially uniform potential to prepare an image panel on the surface for generation of a latent image. The charged portion of the photoconductive member is exposed to a light image of an original document being reproduced. The light radiation exposes the charged photoconductive member for selective dissipation of the uniform charge. The selective dissipation of the uniform potential forms an electrostatic latent image corresponding to the informational areas contained within the original document. The raster output scanner (ROS) is a component of the exposure station that directs light onto the photoreceptor to form the latent image in the xerographic process. After the electrostatic latent image is generated on the photoconductive member, the photoconductive member is rotated to a developer station containing developer material comprised of toner particles that adhere triboelectrically to carrier granules. A bias voltage transfers the toner particles from the carrier granules to the latent image to form a toner powder image on the photoconductive member. The photoconductive member is rotated to a transfer station where the toner powder image is transferred from the photoconductive member to a copy medium. The copy medium is transported to a fuser station where the toner particles are heated and pressed into the copy medium to permanently affix the powder image to the copy medium.

The foregoing generally describes a typical black and white electrophotographic printing machine. With the advent of multicolor electrophotography, a plurality of image forming stations is used to overlay color separated images in pixilated patterns for generation of three or four color images. One example of the plural image forming station architecture utilizes an image-on-image (IOI) system in which the photoreceptive member is recharged, reimaged and developed for each color separation. The charging, imaging, developing and recharging, reimaging and developing of the latent image to impose different color toner particles on the latent image may be performed in a single cycle or in multiple cycles. The multiple pass-machines produce only one color toner image during each pass of the photoreceptor and the image is transferred to the copy medium on the last pass through the machine. The single pass architecture offers a potential for high throughput, but the machine is expensive as it requires a charging, exposure and development stations for each color. While the multi-pass architecture is simpler and less expensive, its throughput is less than the single pass architecture.

Regardless of the architecture, the development of color separation images following the first application of toner particles is complicated by the attenuation of the exposing light by the toner particles. That is, the photoreceptor needs to receive the light in order to alter the voltage at the exposed photoreceptor area. If the light does not penetrate the toner particles, the photoreceptor is not set to a voltage level appropriate for attracting developer material in the amount required for good color quality. For example, if too little cyan toner color is applied over the yellow and magenta toner colors previously applied to a latent image, the resulting color does not properly reproduce the color in the original image.

For good quality imaging, a color image-on-image developer station must deliver consistent toner densities through the entire tone reproduction curve (TRC). Benchmark color systems control the TRC using photoreceptor charge voltages, developer bias voltages, and ROS intensity as actuators. Because different points along the TRC are sensitive to different actuators, the reproduction process can be controlled along the entire curve to produce consistent toner densities. However, systems that control the TRC by altering the power levels of the ROS need careful control, otherwise, the variations in the reproduced colors may be unacceptable. One may monitor the density of applied toner particles following application of the toner particles at a development station with densitometers that are used to regulate the bias voltages for development stations. This bias is the same across the entire photoreceptor; however, the voltage difference driving toner to the photoreceptor may vary substantially between bare and toned areas of the photoreceptor, if light attenuation by the toner layer is too large. Control of the TRC based on measurements of development on bare photoreceptor areas case does not adequately reproduce colors on photoreceptor areas having multiple layers of toner obtained from multiple development stations. To address this issue, control of ROS intensity may be used, but this method requires careful balancing. A wider range of ROS intensity may give better control of the TRC on bare photoreceptor areas; but, a narrower range may be required for overall color stability. Because the voltage difference due to ROS attenuation is highly variable, depending on charge level and photoreceptor properties, a constant range of ROS power either unnecessarily constrains toner density control, or allows too much variation in image-on-image density. Thus, variation of the ROS power range is required. The range must be adapted to the specific machine configuration, which includes photoreceptor, ROS, and exposure geometry. Too much, or too little, ROS power variation makes overall color stability unacceptable.

SUMMARY OF THE INVENTION

The present invention addresses the need for monitoring the quality of color reproduction in color xerographic machines so that the ROS power is controlled within a range that does not degrade the image-on-image colors generated by the machine to an unacceptable level. The method includes determining a minimum ROS power level for a minimum photoreceptor charge level, determining a minimum ROS power level for a maximum photoreceptor charge level, calculating a linear relationship between the two determined minimum ROS power levels, establishing a ROS power lower limit for a photoreceptor charge level from the calculated linear relationship, and maintaining the ROS power level at or above the established ROS power lower limit.

The determinations of the minimum ROS power levels for the minimum and the maximum photoreceptor charge levels include successively lowering the power level of a ROS and measuring the discharge voltage response of the photoreceptor until the difference between successive discharge voltage responses exceeds a discharge voltage difference maximum and interpolating the ROS power level at which the discharge voltage maximum is reached. The ROS power level at which the difference between successive discharge voltage responses is equal to the discharge voltage maximum is the lowest ROS power level that may be used for exposure of an image without suffering perceptible color defects. The light attenuation factor by which the laser power is successively reduced corresponds to the light attenuation caused by one or more layers of color toner particles.

A system made in accordance with the present invention includes a photoreceptor charger control, an attenuation data collector, a ROS lower limit calculator, and a ROS lower limit function generator. The attenuation data collector sets the ROS power to its maximum power setting and then reduces the ROS power by the light attenuation factor as it measures the discharge voltages until the change in discharge voltage exceeds a maximum discharge voltage difference. The ROS lower limit calculator determines the ROS power level at which the discharge voltage change caused by the light attenuation factor equals the maximum discharge voltage difference. The ROS lower limit function generator determines whether data from other photoreceptor charge levels are required. If they are, it signals the photoreceptor charger control to change the photoreceptor charge level so the system collects additional attenuation data and computes the ROS lower limit for the new charge level. Once the ROS lower limit data for the maximum and minimum photoreceptor charge levels have been determined, the ROS lower limit function generator determines the slope and offset for the ROS lower limit function. Thereafter, the ROS lower limit function generator may obtain the photoreceptor charging level from the photoreceptor charger control and determine the ROS lower limit for the current photoreceptor charge level. The ROS lower limit may be provided to the machine process control for defining the lower bounds on the laser control of the ROS. The components of the system may be implemented in software modules executed by the controller 90 or they may be implemented with hardware and software components in a known manner.

The above described features and advantages, as well as others, will become more readily apparent to those of ordinary skill in the art by reference to the following detailed description and accompanying drawings.

DETAILED DESCRIPTION OF THE INVENTION

Figure 1:
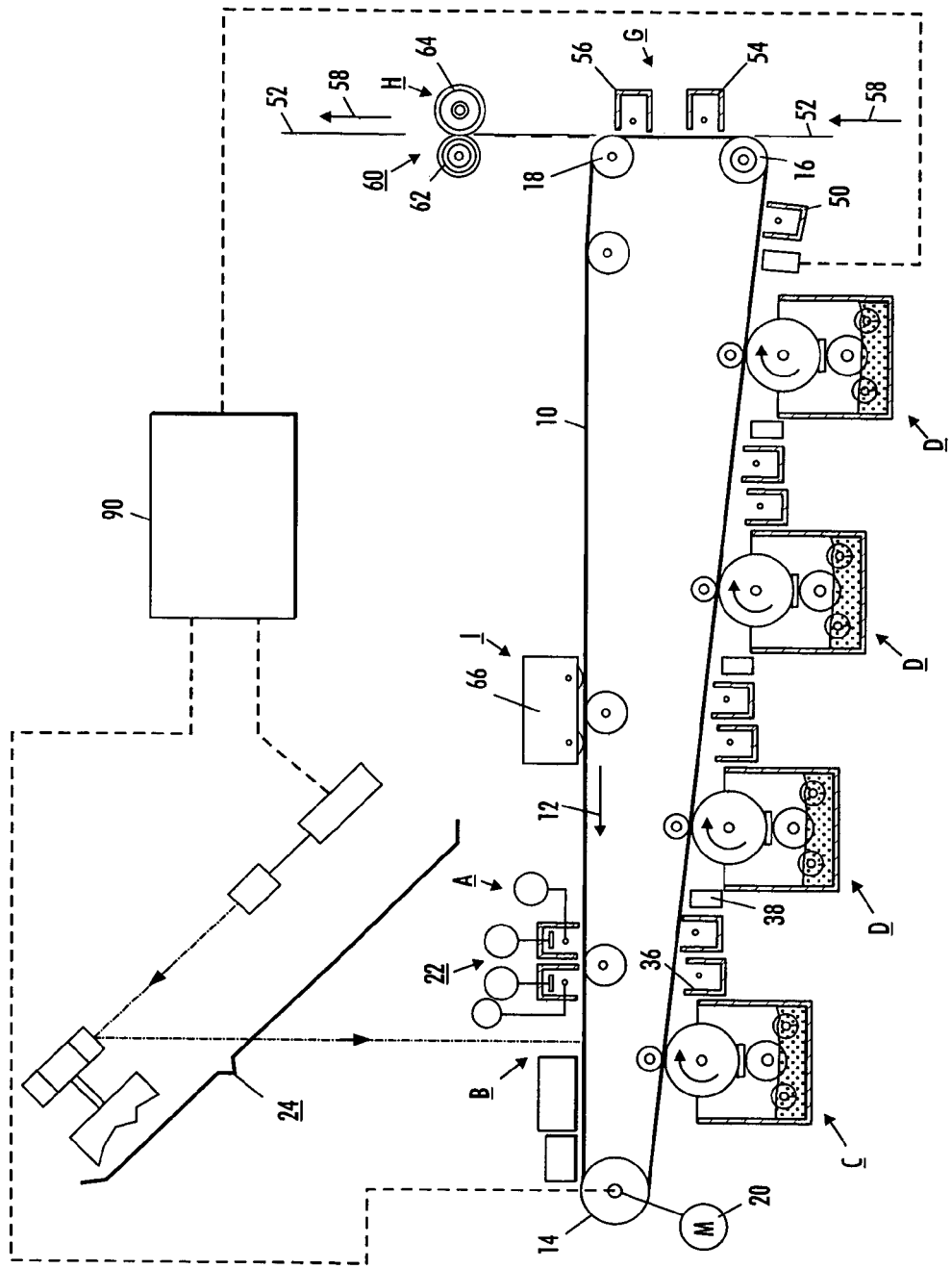
FIG. 1 is a schematic view of a full color image-on-image single pass electrophotographic printing machine.

FIG. 1 depicts a printing machine in which the ROS boundary limits of the present invention are used. The machine includes a charge retentive surface in the form of an Active Matrix (AMAT) photoreceptor belt 10 supported for movement in the direction indicated by arrow 12 so it sequentially advances through the various xerographic process stations. The belt is entrained about a drive roller 14, tension roller 16 and fixed roller 18. The roller 14 is operatively connected to a drive motor 20 for moving the belt through the xerographic stations.

With continued reference to FIG. 1, a portion of belt 10 passes through charging station A where a corona generating device, indicated generally by the reference numeral 22, charges the photoconductive surface of belt 10 to a relatively high, substantially uniform, preferably negative potential. Next, the charged portion of photoconductive surface is advanced through an imaging station B. At exposure station B, the uniformly charged belt 10 is exposed to a laser based output scanning device 24 that causes the charge retentive surface to be selectively discharged. The laser of device 24 is driven in accordance with the print data signals received from controller 90. Preferably the scanning device is a laser Raster Output Scanner (ROS). Alternatively, the ROS could be replaced by other xerographic exposure devices such as LED arrays.

The photoreceptor 10, which is initially charged to a voltage $V_0$, undergoes dark decay to a level $V_{ddp}$ equal to about −500 volts. The areas receiving the laser output at the exposure station B are discharged to $V_{expose}$, which is typically equal to about −50 volts. Thus, after exposure, the photoreceptor 10 contains a monopolar voltage profile of high and low voltages, the former corresponding to charged areas and the latter corresponding to discharged or background areas.

At a first development station C, a developer housing utilizes a hybrid scavengeless development (HSD) system. The HSD system includes a development roll, better known as the donor roll, and is powered by several development fields (potentials across an air gap). The first field is the wire ac field which is used for toner cloud generation. The second field is the dc development field which is used to control the amount of developed toner mass on the photoreceptor. Other ac and dc fields between the donor, wires, and photoreceptor may be used by skilled practitioners of the art to minimize image defects and change the TRC response to the actuators. The toner cloud causes charged toner particles to be attracted to the electrostatic latent image. Appropriate developer biasing is accomplished via a power supply. This type of system is a noncontact type in which only toner particles are attracted to the latent image and there is no mechanical contact between the photoreceptor and a toner delivery device to disturb a previously developed, but unfixed, image.

A corona recharge device 36 having a high output current vs. control surface voltage (I/V) characteristic slope is employed for raising the voltage level of both the toned and untoned areas on the photoreceptor to a substantially uniform level. The recharging device 36 serves to recharge the photoreceptor to a predetermined level. A second exposure or imaging device 38 which comprises a laser based output structure is utilized for selectively discharging the photoreceptor on toned areas and/or bare areas, pursuant to the image to be developed with the second color developer. At this point, the photoreceptor contains toned and untoned areas at relatively high voltage levels and toned and untoned areas at relatively low voltage levels. These low voltage areas represent image areas which are developed using discharged area development (DAD). To this end, a negatively charged, developer material comprising color toner is employed. The toner, which by way of example may be yellow, is contained in a developer housing structure disposed at a second developer station D and is presented to the latent images on the photoreceptor by way of a second HSD developer system. A power supply (not shown) serves to electrically bias the developer structure to a level effective to develop the discharged image areas with negatively charged yellow toner particles.

The above procedure is repeated for a third imager for a third suitable color toner such as magenta and for a fourth imager and suitable color toner such as cyan. The exposure control scheme described below may be utilized for these subsequent imaging steps. In this manner a full color composite toner image is developed on the photoreceptor belt. To the extent to which some toner charge is totally neutralized, or the polarity reversed, thereby causing the composite image developed on the photoreceptor to consist of both positive and negative toner, a negative pre-transfer dicorotron member 50 is provided to condition the toner for effective transfer to a substrate using positive corona discharge.

Subsequent to image development a sheet of support material 52 is moved into contact with the toner images at transfer station G. The sheet of support material is advanced to transfer station G by conventional sheet feeding apparatus, not shown. Preferably, the sheet feeding apparatus includes a feed roll contacting the uppermost sheet of a stack of copy sheets. The feed rolls rotate so as to advance the uppermost sheet from stack into a chute that directs the advancing sheet of support material into contact with photoconductive surface of the belt 10 in a timed sequence so that the toner powder image developed thereon contacts the advancing sheet of support material at transfer station G. Transfer station G includes a transfer dicorotron 54 which sprays positive ions onto the backside of sheet 52. This attracts the negatively charged toner powder images from the belt 10 to sheet 52. A detack dicorotron 56 is provided for facilitating stripping of the sheets from the belt 10.

After transfer, the sheet continues to move, in the direction of arrow 58, onto a conveyor (not shown) which advances the sheet to fusing station H. Fusing station H includes a fuser assembly, indicated generally by the reference numeral 60, which permanently affixes the transferred powder image to sheet 52. Preferably, fuser assembly 60 comprises a heated fuser roller 62 and a backup or pressure roller 64. Sheet 52 passes between fuser roller 62 and backup roller 64 with the toner powder image contacting fuser roller 62. In this manner, the toner powder images are permanently affixed to sheet 52 after it is allowed to cool. After fusing, a chute, not shown, guides the advancing sheets 52 to a catch tray, not shown, for subsequent removal from the printing machine by the operator.

After the sheet of support material is separated from the photoconductive surface of belt 10, the residual toner particles carried by the non-image areas on the photoconductive surface are removed at cleaning station I with a cleaning brush structure contained in a housing 66. The foregoing description is sufficient for the purposes of the present application to illustrate the general operation of a color printing machine.

For image quality reasons, current development systems run in "field mode." This means that plenty of toner is made available to the development process and that the amount of toner that is developed is proportional to the applied development field. In REaD (Recharge, Expose and Develop) Image-on-Image xerography, the four toner layers for a color image are accumulated on the photoreceptor and then transferred together to paper. Development of each color therefore, can occur over previously developed toners. One configuration prints black first, over which no other color is printed. In this configuration, cyan is printed last, where it can encounter previously developed toner particles of yellow, magenta, or both colors.

The attenuation of the beam power caused by the layers of previously developed toner particles may produce a substantial difference in the discharge voltage at an area to which another colored toner is to be developed. Because the discharge voltage affects the density of the toner particles attracted to the area, the color produced by the relative densities of the toner particles is also affected.

Figure 2:
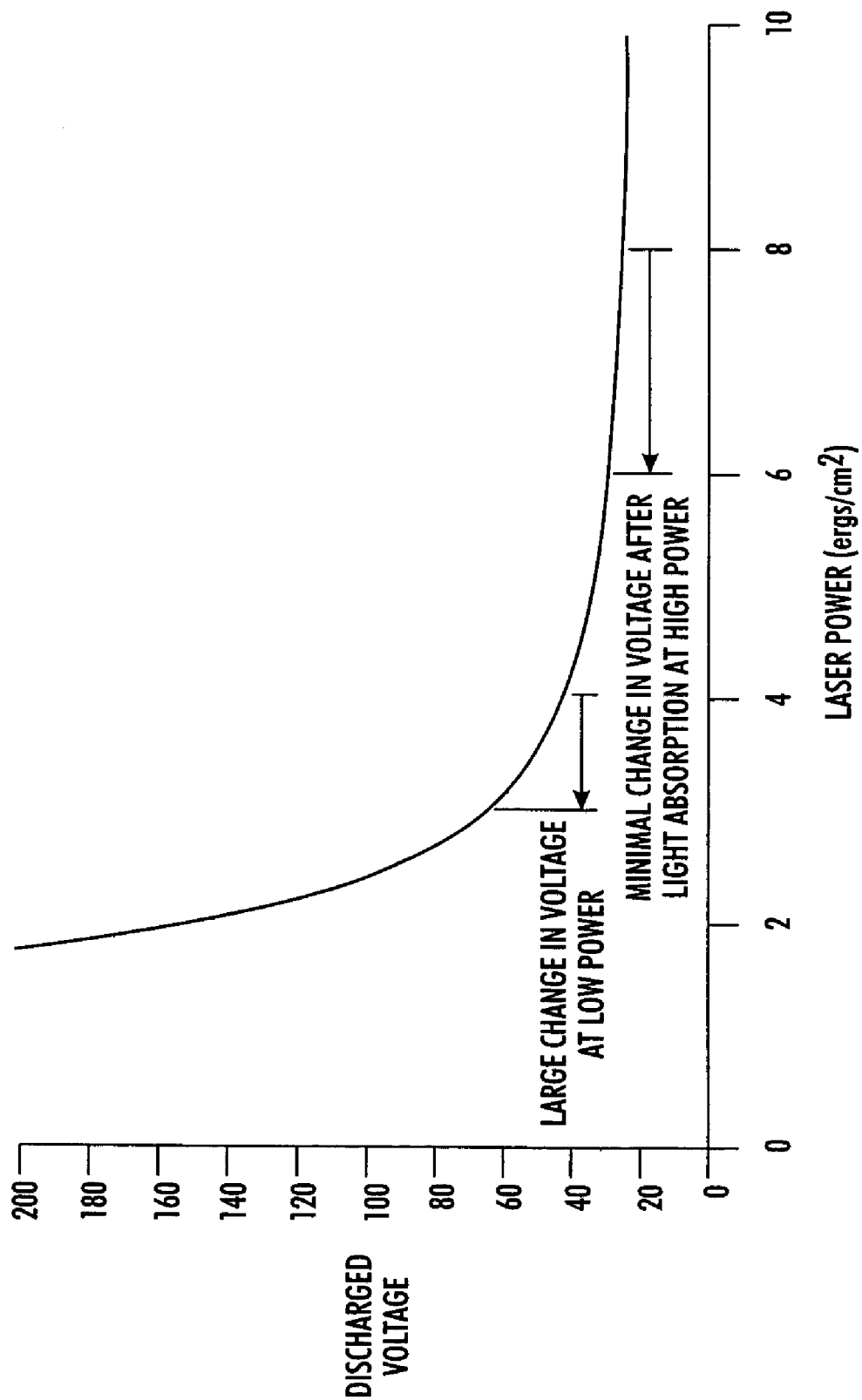
FIG. 2 is a graphical representation of the relationship between laser power levels and their resulting discharge voltages in a photoreceptor.

The curve shown in FIG. 2 demonstrates the effect that light attenuation has at lower ROS powers. As shown in the figure, exposure of a photoreceptor area to a ROS laser beam having a particular power/cm$^2$ value along the horizontal axis results in the voltage shown on the vertical axis. Attenuation of a laser beam from the 8 ergs/cm$^2$ level to the 6 ergs/cm$^2$ level changes the resulting discharge voltage by only a few volts. On the other hand, attenuation of a laser beam from the 4 ergs/cm$^2$ level to the 3 ergs/cm$^2$ level changes the resulting discharge voltage by almost 20 volts. This difference in the discharge voltage alters the density of the developed toner and produces a perceptible color variation. Consequently, operation of the ROS at power levels on the lower end of its power curve may result in discharge voltages that produce color defects.

In accordance with the principles of the present invention, the machine of FIG. 1 may have its control program modified so that the controller does not operate any ROS in the machine below a minimum power level. The minimum power level is determined by using the method shown in FIG. 3. During machine initialization, the method sets charge device 22 to its minimum power level and an image panel is charged on the photoreceptor belt 10 (block 120). The controller 90 sets the power level of the laser in ROS 24 to its maximum value and a pixel test pattern is exposed on the image panel to discharge areas of the photoreceptor belt 10 for forming a latent image (block 124). The voltages of the charged and discharged areas are measured (block 128). The photoreceptor is then advanced to the next station where the belt is recharged to its minimum level and the power level of the ROS used to expose the next color separation image is lowered by an attenuation factor (block 130). The image panel is exposed to the test pattern at the new ROS level and the voltages of the discharge areas are measured again (block 134). The difference between the discharge voltages at the first and second stations is compared to a maximum voltage change limit (block 138). If the difference does not exceed the maximum change limit, the belt is advanced to the next station where the photoreceptor is recharged and the ROS laser power level is decreased from the previously used power level by the attenuation factor. The voltages of the discharge areas exposed to the new laser power level are measured and compared to the previous discharge area voltages to determine where the power level has dropped to a point at which the voltage difference is greater than the maximum voltage change limit (blocks 130-138). Once a ROS power level that produces a voltage difference that is greater than the maximum voltage change limit is determined, as explained in more detail below, to determine the ROS power level at which the discharge voltage change equals the maximum voltage change limit (block 140).

If the testing was not done at the maximum charge level (block 142), the process is repeated with an image panel of the photoreceptor belt 10 charged to the maximum power level (block 144). At the end of the performance of the loop (blocks 124-140), the lower limit for the ROS power level at the maximum charge level is computed (block 140). Using the lower limits for the ROS power level when the photoreceptor is charged to its minimum and maximum charge levels, the lower ROS power limit for other charge levels between the minimum and maximum charge levels may be found (block 148).

Figure 3:
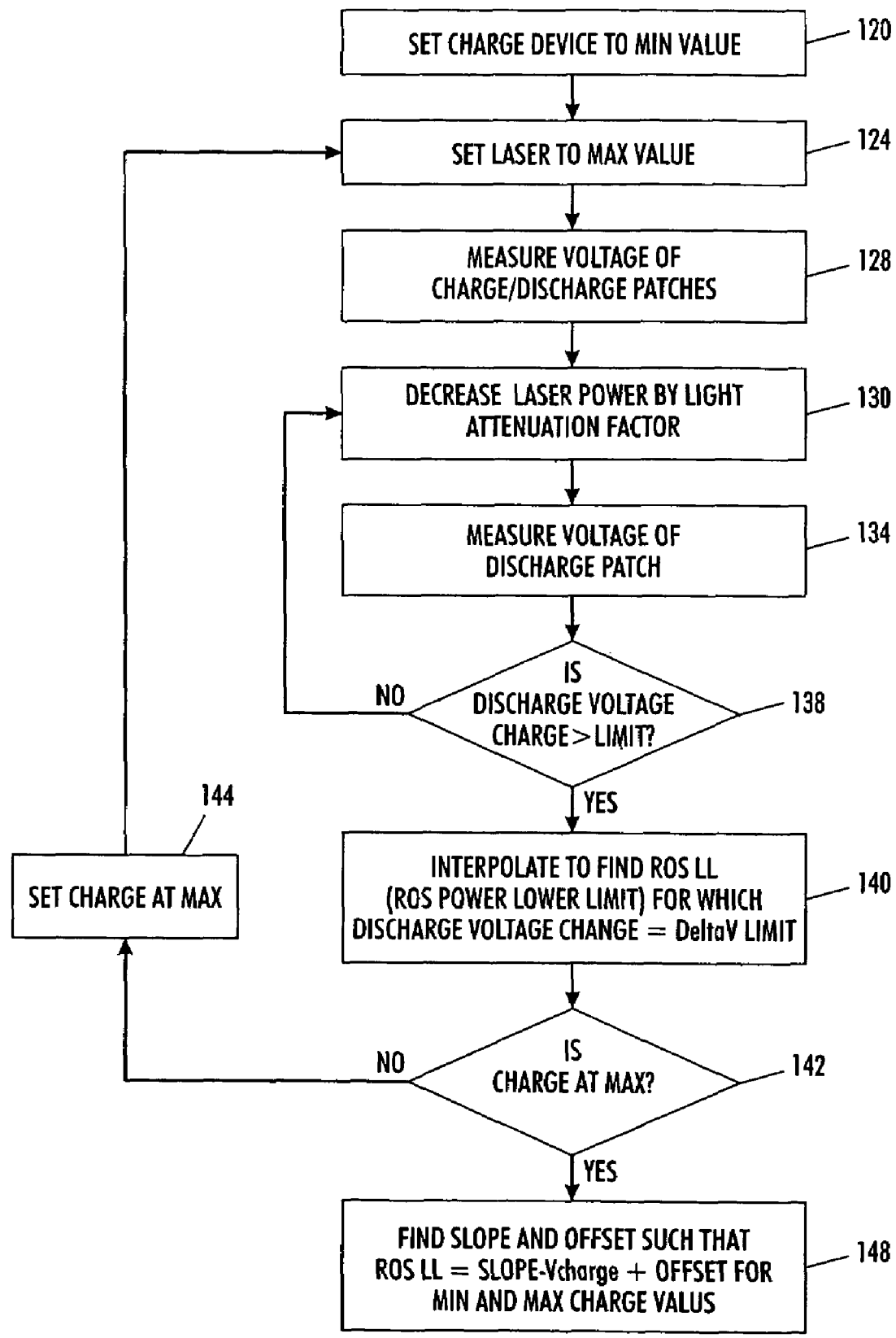
FIG. 3 is a flowchart of the process for determining a lower limit for the ROS power at charge levels for the photoreceptor other than the maximum and minimum charge levels.

In the process shown in FIG. 3, the attenuation factor is an experimentally determined value that approximates the light attenuation caused by development of a single toner particle layer. This light attenuation factor is stored in non-volatile memory. In one embodiment of the present invention, the light attenuation factor is approximately 20% from one level to the next, although this factor varies for various machines and ROS devices used for exposure of latent images. In general, this value also increases for succeeding color stations, since the last ROS may be required to expose the photoreceptor through two or three previously developed toner layers. Also, a maximum discharge voltage change of about 20 Volts has been found acceptable for some particular color xerographic machines, although voltage changes and resulting toner densities vary from types and models of the reproduction machines.

Figure 4:
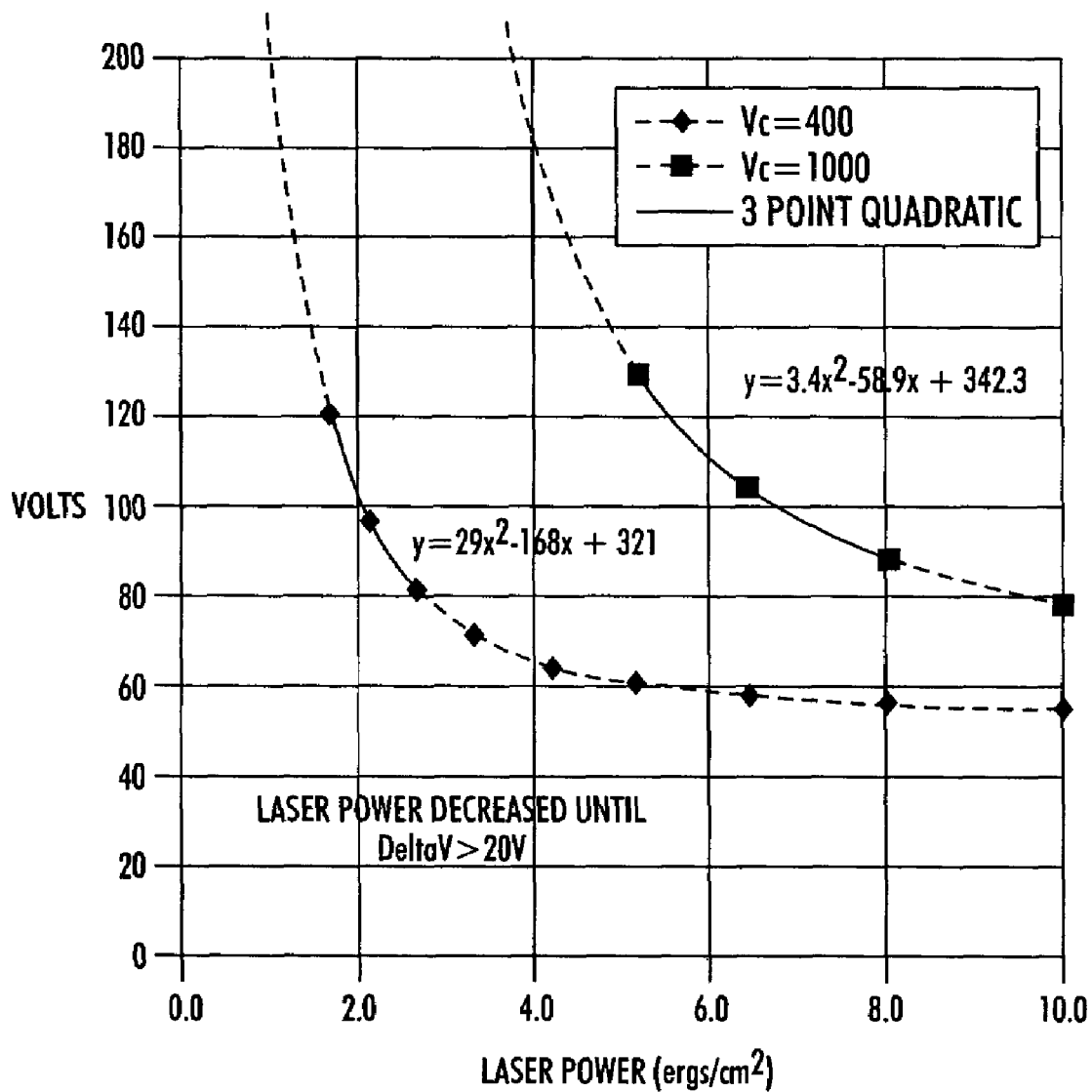
FIG. 4 is a graphical representation of the curves that the attenuation points collected by the process in FIG. 3 fit.

Curves for the discharge voltage vs. light power for two photoreceptor charge values are shown in FIG. 4. Interpolation of the point at which the ROS power level may be decreased by the attenuation factor to produce a discharge voltage change equal to the maximum discharge voltage change requires at least three points because the function is a quadratic curve. To prevent an erroneous calculation arising from the first attenuated exposure generating a discharge voltage difference that exceeds the maximum discharge voltage change, a minimum of three points is generated. The quadratic interpolation may be performed using known quadratic interpolation techniques.

Using the minimum ROS power levels for the maximum and the minimum charge levels, the linear relationship for the minimum ROS power levels for other charge levels may be computed. Specifically, the slope and intercept for this linear relationship may be defined as:

$$\text{LaserPower}_{LL}\text{Slope} = (\text{ROS}_{min}@V_{cmin} - \text{ROS}_{min}@V_{cmax})/(V_{cmin} - V_{cmax})$$

$$\text{LaserPower}_{LL}\text{Offset} = (\text{ROS}_{min}@V_{cmin} - \text{LaserPower}_{LL}\text{Slope}*V_{cmin}).$$

Using these values and the linear relationship, the lower power level for the laser at a charge level between the minimum and maximum charge levels is defined as: $\text{LaserPowerLL} = \text{LaserPower}_{LL}\text{Slope}*\text{Vctarget} + \text{LaserPower}_{LL}\text{Offset}$. Once the controller 90 has computed the lower limit for a current charge level used for charging the photoreceptor belt 10, the controller compares the values determined by the ROS control modules to the lower limit and outputs the greater of the two intensities to the ROS. If the controller cannot maintain the tone reproduction curve with the ROS power set at the ROS lower limit, a fault for the machine is declared. In this manner, color defects caused by toner particle attenuation of the laser light are not produced.

Figure 5:
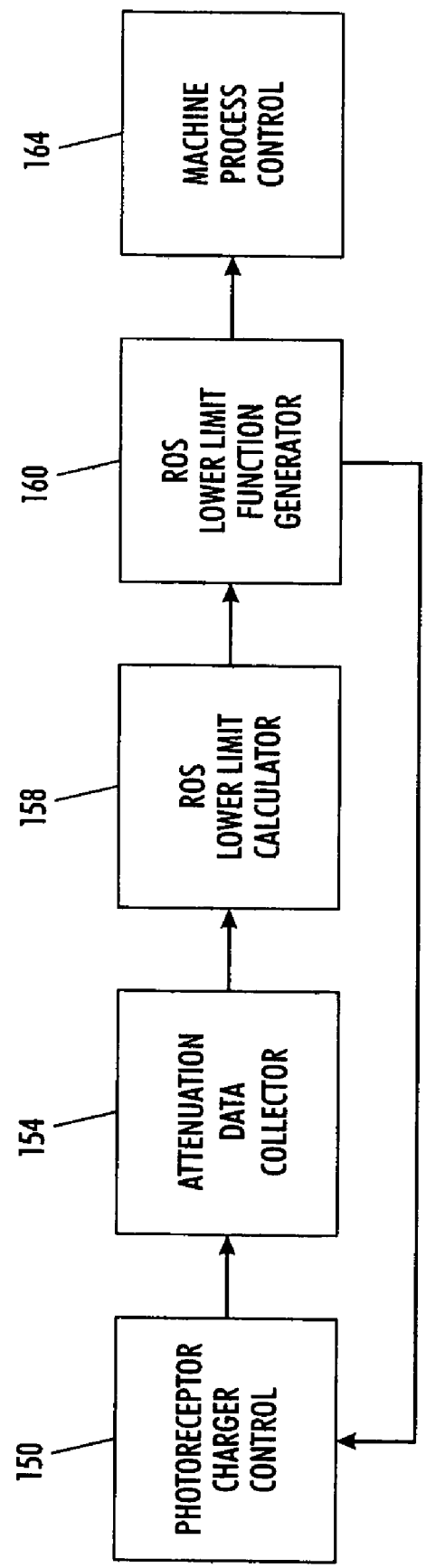
FIG. 5 is a block diagram of a system that determines the lower limit for the power level for the ROS at a photoreceptor charge level during machine operation.

A system that may be used to perform the method of the present invention is shown in FIG. 5. The system includes a photoreceptor charger controller 150 that sets the level of charge for the photoreceptor belt 10. The attenuation data collector 154 sets the laser power to its maximum power setting and then steps its power downwardly by the attenuation factor as it measures the discharge voltages until the change in discharge voltage exceeds a maximum discharge voltage difference. The ROS lower limit calculator 158 determines the ROS power level from which the discharge voltage change caused by the light attenuation factor equals the maximum discharge voltage change. The ROS lower limit function generator 160 determines whether data from other photoreceptor charge levels are required. If they are, it signals the photoreceptor charger control 150 to change the photoreceptor charge level so the system collects additional attenuation data and computes the ROS lower limit for the new charge level. Once the ROS lower limit data for the maximum and minimum photoreceptor charge levels have been determined, the ROS lower limit function generator determines the slope and offset for the ROS lower limit function. Thereafter, the ROS lower limit function generator may obtain the photoreceptor charging level from the photoreceptor charger control 150 and determine the ROS lower limit for the current photoreceptor charge level. The ROS lower limit may be provided to the machine process control for defining the lower bounds on the laser control of the ROS. The components of the system shown in FIG. 5 may be implemented in software modules executed by the controller 90 or they may be implemented with hardware and software components in a known manner.

While the present invention has been illustrated by the description of exemplary processes and system components, and while the various processes and components have been described in considerable detail, applicant does not intend to restrict or in any way limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method for determining a minimum operational power level for operating a raster output scanner (ROS) laser in a color xerographic machine comprising:

charging an image panel on a photoreceptor to a minimum photoreceptor charge level;

exposing the image panel on the photoreceptor to a ROS laser operated at a first power level;

measuring discharge voltages of the image panel on the photoreceptor after exposure to the ROS laser;

continuing to charge the image panel on the photoreceptor to a minimum photoreceptor charge level, exposing the image panel on the photoreceptor to a ROS laser operated at a power level reduced from the power level previously used to operate the ROS laser for image panel exposure, and measuring the discharge voltages of the image panel on the photoreceptor until a difference between discharge voltages of the image panel at successive power levels for operating the ROS laser exceeds a maximum voltage change limit;

interpolating a ROS power level at which the difference between discharge voltages reaches the maximum voltage change limit when the image panel on the photoreceptor is charged to the minimum photoreceptor charge level;

charging an image panel on a photoreceptor to a maximum photoreceptor charge level;

exposing the image panel on the photoreceptor to the ROS laser operated at a second power level that is greater than the first power level;

measuring discharge voltages of the image panel on the photoreceptor after exposure to the ROS laser;

continuing to charge the image panel on the photoreceptor to a maximum photoreceptor charge level, exposing the image panel on the photoreceptor to a ROS laser operated at a power level reduced from the power level previously used to operate the ROS laser for image panel exposure, and measuring the discharge voltages of the image panel on the photoreceptor until a difference between discharge voltages of the image panel at successive power levels for operating the ROS laser exceeds a maximum voltage change limit;

interpolating a ROS power level at which the difference between discharge voltages reaches the maximum voltage change limit when the image panel on the photoreceptor is charged to the maximum photoreceptor charge level;

calculating a linear relationship between the two interpolated ROS power levels; and establishing a ROS power lower limit for a photoreceptor charge level from the calculated linear relationship.

2. The method of claim 1 wherein the interpolation includes a quadratic interpolation of at least three points defined by the measured discharge voltages.

3. The method of claim 2 further comprising:
measuring a minimum of three discharge voltages for three different power levels used to operate the ROS laser.

4. The method of claim 1 further comprising:
operating the ROS laser of the color xerographic machine at or above the established ROS power lower limit.

5. The method of claim 1 wherein the power level used to operate the ROS laser is reduced by a light attenuation factor that corresponds to light power reduction caused by a layer of color toner particles.

6. A system for determining a minimum operational power level used to operate a ROS laser in a color xerographic machine comprising:
a photoreceptor charger control configured to set a charge level for a photoreceptor of a color xerographic printing machine;
an attenuation data collector configured to set a power level for a ROS laser in the color xerographic color machine to its maximum power setting, and to reduce the power level used to operate the ROS laser by a light attenuation factor as the attenuation data collector measures discharge voltages of the photoreceptor following exposures to the ROS laser until a difference between discharge voltages of the photoreceptor following exposures to the ROS laser at successive power levels exceeds a maximum voltage change limit;
a ROS lower limit calculator configured to determine a minimum ROS lower limit from the power levels used to operate the ROS laser and the measured discharge voltages collected by the attenuation data collector for a minimum photoreceptor charge level and a minimum ROS lower limit from the power levels used to operate the ROS laser and the measured discharge voltages collected by the attenuation data collector for a maximum photoreceptor charge level; and
a ROS lower limit function generator configured to determine a linear relationship between the minimum ROS lower limits determined by the ROS lower limit calculator.

7. The system of claim 6 wherein the ROS lower limit calculator is further configured to determine the power level for operating the ROS laser at which the difference between discharge voltages caused by exposure of the photoreceptor to the ROS laser operated at a first power level and exposure of the photoreceptor to the ROS laser operated at the first power level reduced by the light attenuation factor equals the maximum voltage change limit.

8. The system of claim 7, the ROS lower limit function generator being further configured to determine whether power level data and discharge voltage data obtained from charging the photoreceptor to other photoreceptor charge levels are required, and to generate signals for the photoreceptor charger control to change the photoreceptor charge level in response to a determination that data obtained from charging the photoreceptor to other photoreceptor charge levels is required.

9. The system of claim 6, the ROS lower limit function generator is further configured to determine a slope and an offset for the linear relationship.

10. The system of claim 9, the ROS lower limit function generator is further configured to obtain photoreceptor charging levels from the photoreceptor charger control, and to determine a lower power level limit corresponding to a current photoreceptor charge level.

11. The system of claim 10 wherein the lower power level limit defines a lower bound on the power level used to operate the ROS laser.

12. A method for determining a minimum operational power level for a raster output scanner (ROS) laser in a color xerographic machine comprising:
charging a photoreceptor medium to a first charge level;
exposing the charged photoreceptor medium with a ROS laser operated at a maximum power level;
measuring voltages on the exposed photoreceptor medium;
continuing to charge the photoreceptor medium to the first charge level, expose the charged photoreceptor to the ROS laser operated at successively lower power levels, and measure voltages on the exposed photoreceptor medium;
charging a photoreceptor medium to a second charge level;
exposing the charged photoreceptor medium with the ROS laser operated at the maximum power level;
measuring voltages on the exposed photoreceptor medium;
continuing to charge the photoreceptor medium to the second charge level, expose the charged photoreceptor to the ROS laser operated at successively lower power levels, and measure voltages on the exposed photoreceptor medium;
interpolating a minimum power level for operating the ROS laser when the photoreceptor is charged to a minimum photoreceptor charge level;
interpolating a minimum power level for operating the ROS laser when the photoreceptor is charged to a maximum photoreceptor charge level, each of the interpolated minimum power levels being an interpolation between two successive power levels used to operate the ROS laser for exposure of the charged photoreceptor medium;
calculating a linear relationship between the two interpolated minimum power levels; and
establishing from the calculated linear relationship a lower limit for a power level at which the ROS laser is operated for a photoreceptor charge level.

13. The method of claim 12 wherein the interpolation includes a quadratic interpolation of at least three points corresponding to three measured voltages on the photoreceptor medium and three corresponding power levels at which the ROS laser was operated to obtain the three measured voltages on the photoreceptor medium.

14. The method of claim 12 wherein the continuation of photoreceptor charging, exposing, and voltage measuring continues until a difference between voltages measured on the exposed photoreceptor medium equals a maximum voltage change limit.

15. The method of claim 12 wherein the continuation of photoreceptor charging, exposing, and voltage measuring continues until a minimum of three voltages are measured for three corresponding power levels user to operate the ROS laser for exposure of the photoreceptor medium.

16. The method of claim 12 wherein the successive lowering of the power levels for operating the ROS laser includes:
successively reducing the power level for operating the ROS laser by a light attenuation factor that corresponds to light power reduction caused by at least one layer of color toner particles.

* * * * *